United States Patent [19]

Hicks et al.

[11] Patent Number: 5,516,873
[45] Date of Patent: May 14, 1996

[54] POLYISOCYANATE/POLYAMINE MIXTURES AND THEIR USE FOR THE PRODUCTION OF POLYUREA COATINGS

[75] Inventors: Sharon D. Hicks, Pittsburgh; Douglas A. Wicks, Mt. Lebanon; Edward P. Squiller; David C. McClurg, both of Pittsburgh, all of Pa.; Terrell D. Wayt, Moundsville, W. Va.; Robert A. Wade, Carnegie, Pa.

[73] Assignee: Bayer Corporation, Pittsburgh, Pa.

[21] Appl. No.: 273,551

[22] Filed: Jul. 11, 1994

[51] Int. Cl.[6] ............... C08G 18/08; C08G 18/28; C08G 18/70; C08G 18/72
[52] U.S. Cl. ............... 528/60; 528/61; 528/62; 528/64; 528/65
[58] Field of Search ............... 528/60, 61, 62, 528/64, 65, 66, 68

[56] References Cited

U.S. PATENT DOCUMENTS

| | | | |
|---|---|---|---|
| 3,420,800 | 1/1969 | Haggis | 528/59 |
| 3,567,692 | 3/1971 | Haggis et al. | 260/75 |
| 5,124,427 | 6/1992 | Potter et al. | 528/67 |
| 5,126,170 | 6/1992 | Zwiener et al. | 427/385.5 |
| 5,214,086 | 5/1993 | Mormile et al. | 524/237 |

*Primary Examiner*—Jeffrey Mullis
*Attorney, Agent, or Firm*—Joseph C. Gil; Thomas W. Roy

[57] ABSTRACT

The present invention relates to a coating composition which is free from polyols and contains a) a polyisocyanate component,
b) an aldimine based on the reaction product of a polyamine having 2 or more primary amino groups with an aldehyde and
c) a compound containing aspartate groups, wherein components a), b) and c) are present in an amount sufficient to provide an equivalent ratio of isocyanate groups to aldimine groups and aspartate groups of 0.5:1 to 20:1 and wherein component c) is present in an amount sufficient to form a clear solution within 60 minutes of mixing components a), b) and c), provided that the amount of component c) is at least 5% by weight, based on the weight of components b) and c).

The present invention also relates to a polyurea coating prepared from this coating composition.

25 Claims, No Drawings

POLYISOCYANATE/POLYAMINE MIXTURES AND THEIR USE FOR THE PRODUCTION OF POLYUREA COATINGS

BACKGROUND OF THE INVENTION

1. Field of the Invention

The present invention relates to polyisocyanate/polyamine mixtures in which the binder components possess improved compatibility with one another resulting in the production of coatings with improved optical properties, e.g., clarity.

2. Description of the Prior Art

One-component coating compositions which may be cured at room temperature are known and contain fully reacted polyurethanes as the binder. These compositions have the advantage that they are available as fully formulated systems which may be directly applied to suitable substrates without any preliminary steps except for mild stirring. Disadvantages of these systems are that large amounts of organic solvents are needed to reduce the viscosity of fully reacted, i.e., high molecular weight, polyurethanes and the polyurethanes must be essentially linear polyurethanes, which do not possess certain properties, e.g., solvent resistance, which may be obtained from crosslinked polyurethanes.

Two-component coating compositions are also known. These compositions come in two containers. The first contains a polyisocyanate, while the second contains an isocyanate-reactive component, generally a polyol. These systems do not require large amounts of solvent to obtain a suitable processing viscosity and can be used to obtain highly crosslinked coatings which possess properties that surpass those possessed by one-component coatings. However, these systems must be accurately mixed or the properties of the resulting coatings can be substantially affected. In addition, after the components are mixed they have a limited pot life since the components continue to react until an unusable solid is obtained.

Coating compositions which possess the advantages of the known one- and two-component coating compositions without possessing their disadvantages have been disclosed in copending applications, U.S. Ser. Nos. 08/171,281; 08/171,550; 08/171,304; 08/193,978; and 08/193,296. The coating compositions are prepared by blending polyisocyanates with certain aldimines. Even though coatings prepared in accordance with these copending applications possess many desirable properties, further improvements are needed in the appearance of the coatings, i.e., clarity, gloss and distinctness of image (DOI). These properties are directly related to the compatibility between the polyisocyanate and the aldimine.

Copending application, U.S. Ser. No. 08/171,281, discloses that the compatibility with aldimines may be improved by using certain allophanate group-containing polyisocyanates. However, there is still a need to achieve these improvements in compatibility and appearance with other commercially available polyisocyanates. In addition, even though the allophanate group-containing polyisocyanates described in the copending application are compatible with aldimines, they are not initially compatible, i.e., a cloudy solution is intially formed. It may take 30 minutes or longer before a clear solution is obtained. In those applications in which it is desired to prepare a coating immediately after blending the components of the coating composition, it is necessary to improve the initial compatibility between the allophanate group-containing polyisocyanates and aldimines.

It is an object of the present invention to improve the compatibility, including the initial compatibility, between polyisocyanates and aldimines so that the clarity, gloss and DOI of the resulting coatings is also improved. This object may be achieved with coating compositions according to the invention, which in addition to polyisocyanates and aldimines, also contain the polyaspartates described hereinafter.

U.S. Pat. Nos. 3,420,800 and 3,567,692 disclose coating compositions containing polyisocyanates and either aldimines or ketimines. U.S. Pat. No. 5,126,170 discloses coating compositions containing polyisocyanates, polyaspartates and optionally polyols. However, these patents do not teach that the compatibility of polyisocyanates with aldimines can be improved by the use of polyaspartates.

U.S. Pat. No. 5,214,086 discloses coating compositions containing polyisocyanates, aldimines, polyols and optionally polyaspartates. The examples of the present invention demonstrate that the coating compositions according to the invention possess superior properties when compared to the four component compositions disclosed in U.S. Pat. No. 5,214,086.

SUMMARY OF THE INVENTION

The present invention relates to a coating composition which is free from polyols and contains
a) a polyisocyanate component,
b) an aldimine corresponding to the formula

$$X_1\text{-}[N\!\!=\!\!CHCH(R_1)(R_2)]_n$$

and
c) a compound containing aspartate groups and corresponding to the formula

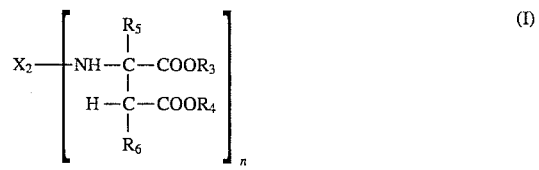

wherein
$X_1$ and $X_2$ may the identical or different and represent an organic group which has a valency of n and is inert towards isocyanate groups at a temperature of 100° C. or less, $R_1$ and $R_2$ may be the same or different and represent optionally substituted hydrocarbon radicals, or $R_1$ and $R_2$ together with the β-carbon atom form a cycloaliphatic or heterocyclic ring, $R_3$ and $R_4$ may be identical or different and represent organic groups which are inert towards isocyanate groups at a temperature of 100° C. or less, $R_5$ and $R_6$ may be identical or different and represent hydrogen or organic groups which are inert towards isocyanate groups at a temperature of 100° C. or less and n represents an integer with a value of at least 2, wherein components a), b) and c) are present in an amount sufficient to provide an equivalent ratio of isocyanate groups to aldimine groups and aspartate groups of 0.5:1 to 20:1 and wherein component c) is present in an amount sufficient to form a clear solution within 60 minutes of mixing components a), b) and c), provided that the amount of component c) is at least 5% by weight, based on the weight of components b) and c).

The present invention also relates to a polyurea coating prepared from this coating composition.

DETAILED DESCRIPTION OF THE INVENTION

Examples of suitable polyisocyanates which may be used as the polyisocyanate component in accordance with the present invention include monomeric diisocyanates, preferably NCO prepolymers and more preferably polyisocyanate adducts. Suitable monomeric diisocyanates may be represented by the formula $$R(NCO)_2$$

in which R represents an organic group obtained by removing the isocyanate groups from an organic diisocyanate having a molecular weight of about 112 to 1,000, preferably about 140 to 400. Diisocyanates preferred for the process according to the invention are those represented by the above formula in which R represents a divalent aliphatic hydrocarbon group having 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-isocyanatocyclohexyl)-methane, 2,4'-dicyclohexyl-methane diisocyanate, 1,3- and 1,4-bis-(isocyanatomethyl)-cyclohexane, bis-(4-isocyanato-3-methyl-cyclohexyl)-methane, α,α, α',α'-tetramethyl-1,3- and/or -1,4-xylylene diisocyanate, 1-isocyanato-1-methyl-4(3)-isocyanatomethyl cyclohexane, 2,4- and/or 2,6-hexahydrotoluylene diisocyanate, 1,3- and/ or 1,4-phenylene diisocyanate, 2,4- and/or 2,6-toluylene diisocyanate, 2,4- and/or 4,4'-diphenyl-methane diisocyanate, 1,5-diisocyanato naphthalene and mixtures thereof. Aromatic polyisocyanates containing 3 or more isocyanate groups such as 4,4',4"-triphenylmethane diisocyanate and polyphenyl polymethylene polyisocyanates obtained by phosgenating aniline/formaldehyde condensates may also be used.

In accordance with the present invention the polyisocyanate component is preferably in the form of an NCO prepolymer or a polyisocyanate adduct, more preferably a polyisocyanate adduct. Suitable polyisocyanate adducts are those containing isocyanurate, uretdione, biuret, urethane, allophanate, carbodiimide and/or oxadiazinetrione groups. The polyisocyanates adducts have an average functionality of 2 to 6 and an NCO content of 5 to 30% by weight.

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a trialkyl phosphine catalyst and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 400, such as trimethylol propane, glycerine, 1,2-dihydroxy propane and mixtures thereof. The urethane group-containing polyisocyanates have a most preferred NCO content of 2 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyisocyanates which may be prepared in accordance with the processes set forth in U.S. Pat. Nos. 5,124,427, 5,208,334 and 5,235,018, the disclosures of which are herein incorporated by reference, preferably polyisocyanates containing these groups in a ratio of monoisocyanurate groups to monoallophanate groups of about 10:1 to 1:10, preferably about 5:1 to 1:7.

7) Carbodiimide group-containing polyisocyanates which may be prepared by oligomerizing di- or polyisocyanates in the presence of known carbodiimidization catalysts as described in DE-PS 1,092,007, U.S. Pat. No. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, biuret groups or mixtures of isocyanurate and allophanate groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Further details concerning the low molecular weight compounds and the starting materials and methods for preparing the high molecular weight polyhydroxy compounds are disclosed in U.S. Pat. No. 4,701,480, herein incorporated by reference.

These NCO prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present. In accordance with the present invention NCO prepolymers also include NCO semi-prepolymers which contain unreacted starting polyisocyanates in addition to the urethane group-containing prepolymers.

Suitable aldimines for as component b) include those prepared from an aldehyde and polyamines corresponding to the formula $$X_1\text{-}(NH_2)_n$$

wherein $X_1$ represents an organic group which has a valency of n and is inert towards isocyanate groups at a temperature of 100° C. or less, preferably a hydrocarbon group obtained by the removal of the amino groups from an aliphatic, araliphatic or cycloaliphatic polyamine, more preferably a diamine, and n represents an integer with a value of at least 2, preferably 2 to 6, more preferably 2 to 4 and most preferably 2.

The polyamines include high molecular weight amines having molecular weights of 400 to about 10,000, preferably 800 to about 6,000, and low molecular weight amines having molecular weights below 400. The molecular weights are number average molecular weights ($M_n$) and are determined by end group analysis (NH number). Examples of these polyamines are those wherein the amino groups are attached to aliphatic, cycloaliphatic, araliphatic and/or aromatic carbon atoms.

Suitable low molecular polyamines starting compounds include ethylene diamine, 1,2- and 1,3-propane diamine, 2-methyl-1,2-propane diamine, 2,2-dimethyl-1,3-propane diamine, 1,3- and 1,4-butane diamine, 1,3- and 1,5-pentane diamine, 2-methyl-1,5-pentane diamine, 1,6-hexane diamine, 2,5-dimethyl-2,5-hexane diamine, 2,2,4-and/or 2,4,4-trimethyl-1,6-hexane diamine, 1,7-heptane diamine, 1,8-octane diamine, 1,9-nonane diamine, 1,10-decane diamine, 1,11-undecane diamine, 1,12-dodecane diamine, 1-amino-3-aminomethyl-3,5,5-trimethyl cyclohexane, 2,4- and/or 2,6-hexahydrotoluylene diamine, 2,4'- and/or 4,4'-diamino-dicyclohexylmethane, 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane), 1,3- and/or 1,4-cyclohexane diamine, 1,3-bis(methylamino)-cyclohexane, 1,8-p-menthane diamine, hydrazine, hydrazides of semicarbazido carboxylic acids, bis-hydrazides, bis-semicarbazides, phenylene diamine, 2,4- and 2,6-toluylene diamine, 2,3- and 3,4-toluylene diamine, 2,4'- and/or 4,4'-diaminodiphenyl methane, higher functional polyphenylene polymethylene polyamines obtained by the aniline/formaldehyde condensation reaction, N,N,N-tris-(2-aminoethyl)-amine, guanidine, melamine, N-(2-aminoethyl)-1,3-propane diamine, 3,3'-diamino-benzidine, polyoxypropylene amines, polyoxyethylene amines, 2,4-bis-(4'-aminobenzyl)-aniline and mixtures thereof.

Preferred polyamines are 1-amino-3-aminomethyl-3,5,5-trimethyl-cyclohexane (isophorone diamine or IPDA), bis-(4-aminocyclohexyl)-methane, bis-(4-amino-3-methylcyclohexyl)-methane, 1,6-diaminohexane, 2-methyl pentamethylene diamine and ethylene diamine.

Suitable high molecular weight polyamines correspond to the polyhydroxyl compounds used to prepare the NCO prepolymers with the exception that the terminal hydroxy groups are converted to amino groups, e.g., by amination or by reacting the hydroxy groups with a diisocyanate and subsequently hydrolyzing the terminal isocyanate group to an amino group. Preferred high molecular weight polyamines are amine-terminated polyethers such as the Jeffamine resins available from Texaco.

Suitable aldehydes are those corresponding to the formula $$O=CHCH(R_1)(R_2)$$

wherein $R_1$ and $R_2$ may be the same or different and represent optionally substituted hydrocarbon radicals, preferably containing 1 to 10, more preferably 1 to 6, carbon atoms, or $R_1$ and $R_2$ together with the β-carbon atom form a cycloaliphatic or heterocyclic ring.

Examples of suitable aldehydes include isobutyraldehyde, 2-ethyl hexanal, 2-methyl butyraldehyde, 2-ethyl butyraldehyde, 2-methyl valeraldehyde, 2,3-dimethyl valeraldehyde, 2-methyl undecanal and cyclohexane carboxyaldehyde.

The aldimines may be prepared in known manner by reacting the polyamines with the aldehydes either in stoichiometric amounts or with an excess of aldehyde. The excess aldehyde and the water which is produced can be removed by distillation. The reactions may also be carried out in solvents, other than ketones. The solvents may also be removed by distillation after completion of the reaction.

Component c) is selected from compounds at least two aspartate groups and corresponding to the formula:

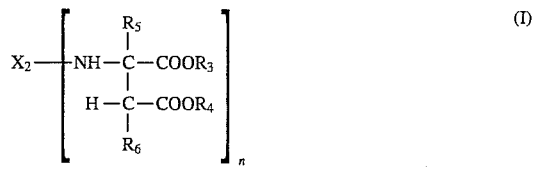

wherein $X_2$ represents an organic group which has a valency of n and is inert towards isocyanate groups at a temperature of 100° C. or less, preferably a divalent hydrocarbon group obtained by the removal of the amino groups from an aliphatic, araliphatic or cycloaliphatic polyamine, more preferably a diamine, $R_3$ and $R_4$ may be identical or different and represent organic groups which are inert towards isocyanate groups at a temperature of 100° C. or less, preferably methyl or ethyl groups, $R_5$ and $R_6$ may be identical or different and represent hydrogen or organic groups which are inert towards isocyanate groups at a temperature of 100° C. or less, preferably hydrogen and n represents an integer with a value of at least 2, preferably 2 to 6, more preferably 2 to 4 and most preferably 2.

These compounds are prepared in known manner by reading the corresponding primary polyamines corresponding to the formula $$X_2\text{-}(NH_2)_n \qquad (II)$$

with optionally substituted maleic or fumaric acid esters corresponding to the formula $$R_3OOC—CR_5=CR_6—COOR_4 \qquad (III)$$

Suitable polyamines include those previously set forth for preparing aldimines b). Preferred are 1,4-diaminobutane, 1,6-diaminohexane, 2,2,4- and 2,4,4-trimethyl-1,6-diaminohexane, 1,3- and/or 1,4-cyclohexane diamine, 1-amino-3,3,5-trimethyl-5-aminomethyl-cyclohexane, 2,4- and/or 2,6-hexahydrotoluylene diamine, 4,4'-diamino-dicyclohexyl methane, 3,3-dimethyl-4,4'-diamino-dicyclohexyl methane and 3,3-diethyl-4,4'-diamino-dicyclohexyl methane.

Examples of optionally substituted maleic or fumaric acid esters suitable for use in the preparation of the compounds corresponding to formula I include dimethyl, diethyl and di-n-butyl esters of maleic acid and fumaric acid and the corresponding maleic or fumaric acid esters substituted by methyl in the 2- and/or 3-position.

The preparation of the "polyaspartic acid derivatives" corresponding to formula I from the above mentioned starting materials may be carried out, for example, at a temperature of 0° to 100° C. using the starting materials in such proportions that at least 1, preferably 1, olefinic double bond is present for each primary amino group. Excess starting materials may be removed by distillation after the reaction. The reaction may be carried out solvent-free or in the presence of suitable solvents such as methanol, ethanol, propanol, dioxane and mixtures of such solvents.

Examples of optionally substituted maleic or fumaric acid esters suitable for use in the preparation of the compounds corresponding to formula I include dimethyl, diethyl and di-n-butyl esters of maleic acid and fumaric acid and the corresponding maleic or fumaric acid esters substituted by methyl in the 2- and/or 3-position.

The preparation of the "polyaspartic acid derivatives" corresponding to formula I from the above mentioned starting materials may be carried out, for example, at a temperature of 0° to 100° C. using the starting materials in such proportions that at least 1, preferably 1, olefinic double bond is present for each primary amino group. Excess starting materials may be removed by distillation after the reaction. The reaction may be carried out solvent-free or in the presence of suitable solvents such as methanol, ethanol, propanol, dioxane and mixtures of such solvents.

The binders present in the coating compositions according to the invention contain polyisocyanate component a), aldimine component b) and aspartate component c). The coating compositions do not contain polyols, i.e., compounds containing hydroxyl groups, since their presence reduces the overall properties of the coating compositions and the resulting coatings. As can be seen from Comparison Example 7, the presence of polyols significantly affects the beneficial combination of pot lives and dry times which may be obtained for the coating compositions according to the invention.

Components a), b) and c) are used in amounts sufficient to provide an equivalent ratio of isocyanate groups to aldimine groups and aspartate groups of 0.5:1 to 20:1, preferably 0.8:1 to 3:1 and more preferably 1:1 to 2:1. Component c) is present in an amount sufficient to form a clear solution within 60 minutes, preferably within 30 minutes, more preferably within 5 minutes and most preferably upon the mixing of components a), b) and c), provided that the amount of component c) is at least 5%, preferably at least 10% by weight, based on the weight of components b) and c). Preferably, the compositions according to the invention contain 1 to 80% of component b) and 20 to 99% of component c), more preferably 40 to 80% of component b) and 20 to 60% of component c) and most preferably 60 to 70% of component b) and 30 to 40% of component c), based on the weight of components b) and c).

The amount of component c) that is necessary to obtain a clear solution is dependent upon the particular compounds which are used as components a), b) and c). This amount can be determined in a simple preliminary test by preparing compositions containing varying amounts of component c) and then determining the minimum amount which is necessary obtain a clear solution. Alternatively, although less preferred, the amount of component c) can be determined by continually adding an amount of component c) to a cloudy mixture of components a) and b) until the solution becomes clear.

The binders to be used according to the invention are prepared by mixing all of the individual components together or by premixing two of the components before adding the third component. For example, aspartate c) may be initially blended with the component a) or component b), preferably component b) before the addition of the other component.

Preparation of the binders is carried out solvent-free or in the presence of the solvents conventionally used in polyurethane or polyurea coatings. It is an advantage of the process according to the invention that the quantity of solvent used may be greatly reduced when compared with that required in conventional two-component systems based on polyisocyanates and polyols.

Examples of suitable solvents include xylene, butyl acetate, methyl isobutyl ketone, methoxypropyl acetate, N-methyl pyrrolidone, Solvesso solvent, petroleum hydrocarbons and mixtures of such solvents.

In the coating compositions to be used for the process according to the invention, the ratio by weight of the total quantity of binder components a), b) and c) to the quantity of solvent is about 40:60 to 100:0, preferably about 60:40 to 100:0.

In addition to binder components a), b) and c), the coating compositions may also contain the known additives from coatings technology, such as fillers, pigments, softeners, high-boiling liquids, catalysts, UV stabilizers, anti-oxidants, microbiocides, algicides, dehydrators, thixotropic agents, wetting agents, flow enhancers, matting agents, anti-slip agents, aerators and extenders. Coating compositions containing pigments and/or fillers are especially suitable for the present invention due to the difficulty of removing all of the moisture from these additives.

It is also possible to incorporate other additives which increase the pot life of compositions containing polyisocyanates and aldimines, such as the tin compounds disclosed in copending application, U.S. Ser. No. 08/171,304, and in U.S. Pat. No. 5,243,012, the disclosures of which are herein incorporated by reference; or the zeolites disclosed in copending applications, U.S. Ser. Nos. 08/193,978 and 08/194,296, the disclosures of which are herein incorporated by reference.

The additives are chosen based on the requirements of the particular application and their compatibility with components a), b) and c). The coating compositions may be applied to the substrate to be coated by conventional methods such as painting, rolling, pouring or spraying.

The coating compositions according to the invention have good storage stability and provide coatings which have relatively fast dry times. The coatings are also characterized by high hardness, elasticity, very good resistance to chemicals, high gloss, good weather resistance, good environmental etch resistance and good pigmenting qualities.

The invention is further illustrated, but is not intended to be limited by the following examples in which all parts and percentages are by weight unless otherwise specified.

EXAMPLES

The following starting materials were used in the examples:

Polyisocyanate 1

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa.s (available from Miles Inc. as Desmodur N 3300).

Polyisocyanate 2

A biuret group-containing polyisocyanate prepared from 1,6-hexamethylene diisocyanate and having an isocyanate content of about 3%, a content of monomeric diisocyanate of <0.7% and a viscosity at 25° C. of 1300–2200 mPa.s (available from Miles Inc. as Desmodur N 200).

Polyisocyanate 3

To a 500 ml 3-neck flask equipped with a gas bubbler, mechanical stirrer, thermometer and condenser were added 301.7 parts of hexamethylene diisocyanate and 13.3 parts of 1-butanol. The stirred mixture was heated for 1 hour at 60° C. while dry nitrogen was bubbled through the reaction mixture. The temperature of the reaction mixture was then raised to 90° C. To the reaction mixture at 90° C. were added 0.214 parts of a 4.4% solution of N,N,N-trimethyl-N-benzyl-ammonium hydroxide in 1-butanol. When the reaction mixture reached an NCO content of 34.8%, the reaction was stopped by adding 0.214 parts of di-(2-ethylhexyl)-phosphate. The excess monomer was removed by thin film evaporation to provide an almost colorless clear liquid having a viscosity of 630 mPa.s (25° C.), an NCO content of 19.7% and a free monomer (HDI) content of 0.35%. The yield was 48.6%.

Aldimine 1

210 parts of 4,4'-diaminodicyclohexylmethane (1.0 mole) were charged at ambient temperature into a three necked 500 ml flask equipped with a mechanical stirrer, thermometer, and an addition funnel. 158.4 parts of isobutyraldehyde (2.2 mole) were added dropwise via the addition funnel to the stirred contents of the flask at a rate such that the exotherm of the reaction did not increase the temperature of the reaction mixture above 50° C. During the course of the reaction water was generated as a by-product as evidenced by the gradual change in the appearance of the reaction contents to a milky white mixture. Upon complete addition of the aldehyde, the reaction mixture was heated to maintain a temperature of 50° C. for a period of 1 hour. The water (36 g; 2.0 moles) and excess isobutyraldehyde were removed by azeotropic distillation, followed by a vacuum (ca. 1 torr) stripping step to remove trace quantities of water. The finished product was a clear, almost colorless (<100 APHA) liquid having a viscosity of about 100 mPa.s (25° C.) and an equivalent weight of 159.3 g/eq.

Aldimine 2

116 parts of 2-methyl-1,5-pentanediamine (1.0 mole) were charged at ambient temperature into a three necked 500 ml flask equipped with a mechanical stiffer, thermometer, and an addition funnel. 158.4 parts of isobutyraldehyde (2.2 mole) were added dropwise via the addition funnel to the stirred contents of the flask at a rate such that the exotherm of the reaction did not increase the temperature of the reaction mixture above 50° C. This reaction was completed as set forth above for Aldimine 1. The finished product was a clear, almost colorless (<100 APHA) liquid having a viscosity of about 10 mPa.s (25° C.) and an equivalent weight of 112 g/eq.

Aldimine 3

400 parts of an amine terminated polyether prepared by aminating polypropylene glycol (available from Texaco as Jeffamine D-400) (1.0 mole) were charged at ambient temperature into a three necked 1000 ml flask equipped with a mechanical stirrer, thermometer, and an addition funnel. 216.0 parts of isobutyraldehyde (3.0 mole) were added dropwise via the addition funnel to the stirred contents of the flask at a rate such that the exotherm of the reaction did not increase the temperature of the reaction mixture above 50° C. This reaction was completed as set forth above for Aldimine 1. The finished product was a clear, slightly yellow (110 APHA) liquid with a viscosity of about 19 mPa.s (25° C.) and an equivalent weight of 254 g/eq.

Polyaspartic Acid Ester 1

210 parts of 4,4'-diamino-dicyclohexylmethane (1.0 mole) were added dropwise with stirring to 344 parts of maleic acid diethylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 1400 mPa.s (25° C.) and an equivalent weight of about 276 g/eq.

Polyaspartic Acid Ester 2

116 parts of 2-methyl-1,5-pentanediamine (1.0 mole) were added dropwise with stirring to 344 parts of maleic acid diethylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 90 mPa.s (25° C.) and an equivalent weight of about 230 g/eq.

Polyaspartic Acid Ester 3

400 parts of an amine terminated polyether prepared by aminating polypropylene glycol (available from Texaco as Jeffamine D-400) (1.0 mole) were added dropwise with stirring to 344 parts of maleic acid diethylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 60 mPa.s (25° C.) and an equivalent weight of about 372 g/eq.

Polyaspartic Acid Ester 4

238 parts of 4,4'-diamino-3,3'dimethyl-dicyclohexyl-methane (available from BASF as Laromin C 260) (1.0 mole) were added dropwise with stirring to 344 parts of maleic acid diethylester (2.0 moles) that were previously charged at ambient temperature to a 1 L three necked flask equipped with a stirrer, thermometer and an addition funnel. The amine was added at a rate such that the exotherm did not increase the temperature of the reaction mixture above 50° C. Upon complete addition the contents of the reaction flask were maintained at 50° C. for a period of 12 hours. The resulting product was a clear, colorless liquid having a viscosity of about 1500 mPa.s (25° C.) and an equivalent weight of about 291 g/eq.

PREPARATION OF IMPROVED COMPATIBILITY AMINE CO-REACTANTS ACCORDING TO THE INVENTION:

Example 1

Various amounts of aldimine 1 were blended with polyaspartic acid ester 1 (PAE 1) at ambient temperature. The relative amounts and other data related to these coreactants are presented in Table 1.

TABLE 1

|  | A | B | C | D | E |
|---|---|---|---|---|---|
| Aldimine 1 (wt %) | 0 | 30 | 50 | 70 | 100 |
| PAE 1 (wt %) | 100 | 70 | 50 | 30 | 0 |
| Viscosity (mPa · s @ 25° C.) | 1260 | 690 | 380 | 280 | 90 |
| Equiv. Wt. (g/eq) | 276 | 227 | 202 | 183 | 160 |

Example 2

Various amounts of aldimine 2 were blended with varying amounts of polyaspartic acid ester 2 (PAE 2) at ambient temperature. The relative amounts and other data related to these co-reactants are presented in Table 2.

TABLE 2

|  | F | G | H | I |
|---|---|---|---|---|
| Aldimine 2 (wt %) | 0 | 50 | 80 | 100 |
| PAE 2 (wt %) | 100 | 50 | 20 | 0 |
| Viscosity (mPa · s @ 25° C.) | 90 | 20 | 10 | 5 |
| Equiv. Wt. (g/eq) | 230 | 151 | 125 | 112 |

Example 3

Various amounts of aldimine 3 were blended with polyaspartic acid ester 3 (PAE 3) at ambient temperature. The relative amounts and other data related to these coreactants are presented in Table 3.

TABLE 3

|  | J | K | L | M | N |
|---|---|---|---|---|---|
| Aldimine 3 (wt %) | 0 | 50 | 70 | 80 | 100 |
| PAE 3 (wt %) | 100 | 50 | 30 | 20 | 0 |
| Viscosity (mPa · s @ 25° C.) | 60 | 38 | 26 | 23 | 19 |
| Equiv. Wt. (g/eq) | 372 | 302 | 281 | 271 | 254 |

Example 4

Various amounts of aldimine 2 were blended with polyaspartic acid ester 1 at ambient temperature. The relative amounts and other data related to these co-reactants are presented in Table 4. These examples illustrate that it is possible to use mixtures of aldimines and aspartates that differ structurely to achieve improved compatibility.

TABLE 4

|  | O | P | Q | R |
|---|---|---|---|---|
| Aldimine 2 (wt %) | 50 | 30 | 70 | 100 |
| PAE 1 (wt %) | 50 | 70 | 30 | 0 |
| Viscosity (mPa · s @ 25° C.) | 30 | 85 | 20 | 5 |
| Equiv. Wt. (g/eq) | 159 | 192 | 136 | 112 |

PREPARATION OF POLYUREA COATING SYSTEMS BASED ON POLYISOCYANATES AND IMPROVED COMPATIBILITY CO-REACTANTS ACCORDING TO THE INVENTION

Example 5

Polyurea coating systems were prepared at ambient temperature by mixing an improved compatibility co-reactant with a polyisocyanate at an NCO to N equivalent ratio of 1:1. Compatibility of the coating systems (listed in Table 5) was determined by examining the appearance of the mixtures and films drawn down on glass panels at 5 mil WFT. Immiscibility and cloudiness were used as indicators of incompatibility. While the cure rates and pot lives of the various systems varied depending on the nature of the co-reactant, all systems showing good compatibility cured to give coatings with excellent performance properties.

TABLE 5

| Co-Reactant | Compatibility with Polyisocyanate 1 | Compatibility with Polyisocyanate 2 | Compatibility with Polyisocyanate 3 |
|---|---|---|---|
| Example 1-A | + | + | + |
| Example 1-B | + | + |  |
| Example 1-C | + | + |  |
| Example 1-D | − | − |  |
| Example 1-E | − | − | ? |
| Example 2-F | + | + |  |
| Example 2-G | + | + |  |
| Example 2-H | − | − |  |
| Example 2-I | − | − | + |
| Example 3-J | + | + |  |
| Example 3-K | + | + |  |
| Example 3-L | ? | + |  |
| Example 3-M | − | ? |  |
| Example 3-N | − | − | + |
| Example 4-O | + | + |  |
| Example 4-P | + | + |  |
| Example 4-Q | + | + |  |

TABLE 5-continued

| Co-Reactant | Compatibility with Polyisocyanate 1 | Compatibility with Polyisocyanate 2 | Compatibility with Polyisocyanate 3 |
|---|---|---|---|
| Example 4-R | — | — | |

+ = Compatible
− = Incompatible
? = Initially incompatible; became compatible after 30 minutes Example 6

In addition to compatibility studies, pot lives and dry times were investigated for coating systems based on selected co-reactants. Polyisocyanate 1 was mixed with the coreactants as shown in Table 6 at an NCO/N ratio of 1.0. All systems listed in Table 6 yielded films that were completely clear. Measurement of the viscosity of the coating system 5 minutes after mixing and 65 minutes after mixing allowed for the comparison of pot life data. The ratio of these two viscosities is designated $\eta_{65}/\eta_5$. Coating systems exhibiting a relatively small $\eta_{65}/\eta_5$ value have a relatively long pot life. Dry times of these mixtures were also measured using Gardner dry times. These examples illustrate how blended mixtures of aldimines and polyaspartic acid esters, when combined with polyisocyanates, gave the most desirable combination of compatibility, pot life and dry time as compared to similar systems using only an aldimine, or only a polyaspartic acid ester.

TABLE 6

| Co-Reactant | $\eta_5$ | $\eta_{65}$ | $\eta_{65}/\eta_5$ | Gardner Dry Times set to touch | hard dry |
|---|---|---|---|---|---|
| PAE 1 | 9,500 | gel | NA | 5 min. | 25 min. |
| Example 1-C | 2,650 | 36,250 | 13.7 | 10 min. | 35 min. |
| Example 4-O | 300 | 1,200 | 4.0 | 20 min. | 80 min. |
| Aldimine 1/PAE 4 (50/50) | 1,600 | 2,550 | 1.6 | 50 min. | 180 min. |
| PAE 4 | 3,150 | 7,450 | 2.4 | 360 min. | 1020 min. |

Example 7 (Comparison)

Polyurea/polyurethane coating systems were also prepared for comparison purposes by mixing the co-reactants as shown in Table 7 with a polyester polyol (Desmophen 680–70, available from Miles Inc.) at co-reactant to polyester polyol equivalent ratios of 75/25, 95/5, and 10/90. Polyisocyanate 1 was mixed with the coreactant/polyester blend at an NCO/(N+OH) ratio of 1.0. All systems were completely compatible. Pot life measurements of the coating systems were carried out by measuring the viscosity of the system 5 minutes after mixing and 65 minutes after mixing; this is designated $\eta_{65}/\eta_5$. Note that in the presence of an OH-containing co-reactant (polyester polyol), the pot life of the system was greatly diminished without a corresponding reduction in the dry times when compared to those systems which contain only amine co-reactants. (See TABLE 6).

TABLE 7

| Co-reactant | Co-reactant/polyester polyol eq. ratio | $\eta_5$ | $\eta_{65}$ | $\eta_{65}/\eta_5$ | Gardner Dry Times set to touch | hard dry |
|---|---|---|---|---|---|---|
| PAE 1 | 75/25 | gel | NA | NA | 5 min. | 25 min. |
| Example 1-D | 75/25 | 17,900 | gel | NA | 3 min. | 15 min. |
| Aldimine 1 | 75/25 | 16,300 | gel | NA | 11 min. | NA |
| PAE 4 | 75/25 | 4,600 | gel | NA | 45 min. | 210 min. |
| Aldimine 1/PAE 4 (50/50) | 75/25 | 8,400 | gel | NA | NA | NA |
| Aldimine 1/PAE 4 (50/50) | 95/5 | 2,750 | 73,000 | 26.5 | NA | NA |
| Aldimine 1/PAE 4 (50/50) | 10/90 | 4,725 | 13,100 | 2.8 | 3.5 hrs. | 6+ hrs. |
| None | 0/100 | 3,600 | 6,200 | 1.7 | 2 hrs. | 12 hrs. |

NA - not available

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition which is free from polyols and comprises
   a) a polyisocyanate component,
   b) an aldimine corresponding to the formula

   $$X_1\text{-}[N\!=\!\!=\!\!CHCH(R_1)(R_2)]_n$$

and
   c) a compound containing aspartate groups and corresponding to the formula

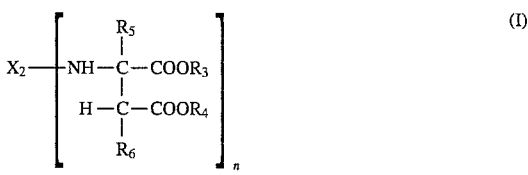

(I)

wherein
   $X_1$ and $X_2$ may be identical or different and represent an organic group which has a valency of n and is inert towards isocyanate groups at a temperature of 100° C. or less,
   $R_1$ and $R_2$ may be the same or different and represent optionally substituted hydrocarbon radicals, or $R_1$ and $R_2$ together with the β-carbon atom form a cycloaliphatic or heterocyclic ring, $R_3$ and $R_4$ may be identical or different and represent organic groups which are inert towards isocyanate groups at a temperature of 100° C. or less, $R_5$ and $R_6$ may be identical or different and represent hydrogen or organic groups which are inert towards isocyanate groups at a temperature of 100° C. or less and η represents an integer with a value of at least 2, wherein components a), b) and c) are present in an amount sufficient to provide an equivalent ratio of isocyanate groups to aldimine groups and aspartate groups of 0.5:1 to 20:1 and wherein component c) is present in an amount sufficient to form a clear solution within 60 minutes of mixing components a), b) and c) at ambient temperature, provided that the amount of component c) is at least 5% by weight, based on the weight of components b) and c).

2. The composition of claim 1 wherein said polyisocyanate is a polyisocyanate adduct which does not contain allophanate groups.

3. The composition of claim 2 wherein $R_1$ and $R_2$ are hydrocarbon radicals containing 1 to 6 carbon atoms.

4. The composition of claim 2 wherein $X_1$ corresponds to the radical obtained by removing the amino groups from bis-(4-aminocyclohexyl)methane and $R_1$ and $R_2$ are methyl.

5. The composition of claim 2 wherein $R_3$ and $R_4$ represent a methyl or ethyl group, $R_5$ and $R_6$ represent hydrogen and n is 2.

6. The composition of claim 1 wherein said polyisocyanate is a polyisocyanate adduct which contains allophanate groups.

7. The composition of claim 6 wherein $X_1$ corresponds to the radical obtained by removing the amino groups from bis-(4-aminocyclohexyl)methane and $R_1$ and $R_2$ are methyl.

8. The composition of claim 6 wherein $R_1$ and $R_2$ are hydrocarbon radicals containing 1 to 6 carbon atoms.

9. The composition of claim 6 wherein $R_3$ and $R_4$ represent a methyl or ethyl group, $R_5$ and $R_6$ represent hydrogen and n is 2.

10. The composition of claim 1 wherein said polyisocyanate is a polyisocyanate adduct containing monoisocyanurate and monoallophanate groups in a ratio of 10:1 to 1:10.

11. The composition of claim 10 wherein $R_1$ and $R_2$ are hydrocarbon radicals containing 1 to 6 carbon atoms.

12. The composition of claim 10 wherein $X_1$ corresponds to the radical obtained by removing the amino groups from bis-(4-aminocyclohexyl)methane and $R_1$ and $R_2$ are methyl.

13. The composition of claim 10 wherein $R_3$ and $R_4$ represent a methyl or ethyl group, $R_5$ and $R_6$ represent hydrogen and n is 2.

14. The composition of claim 1 wherein $R_1$ and $R_2$ are hydrocarbon radicals containing 1 to 6 carbon atoms.

15. The composition of claim 1 wherein $X_1$ corresponds to the radical obtained by removing the amino groups from bis-(4-aminocyclohexyl)-methane and $R_1$ and $R_2$ are methyl.

16. The composition of claim 1 wherein $R_3$ and $R_4$ represent a methyl or ethyl group, $R_5$ and $R_6$ represent hydrogen and n is 2.

17. A polyurea coating prepared from a coating composition which is free from polyols and comprises a) a polyisocyanate component, b) an aldimine corresponding to the formula

$X_1\text{-}[N{=}CHCH(R_1)(R_2)]_n$ and c) a compound containing aspartate groups and corresponding to the formula

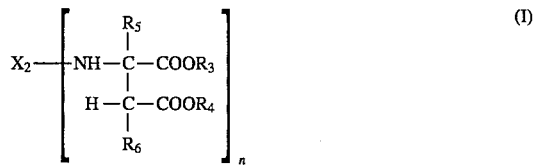

wherein $X_1$ and $X_2$ may be identical or different and represent an organic group which has a valency of n and is inert towards isocyanate groups at a temperature of 100° C. or less, $R_1$ and $R_2$ may be the same or different and represent optionally substituted hydrocarbon radicals, or $R_1$ and $R_2$ together with the β-carbon atom form a cycloaliphatic or heterocyclic ring, $R_3$ and $R_4$ may be identical or different and represent organic groups which are inert towards isocyanate groups at a temperature of 100° C. or less, $R_5$ and $R_6$ may be identical or different and represent hydrogen or organic groups which are inert towards isocyanate groups at a temperature of 100° C. or less and n represents an integer with a value of at least 2, wherein components a), b) and c) are present in an amount sufficient to provide an equivalent ratio of isocyanate groups to aldimine groups and aspartate groups of 0.5:1 to 20:1 and wherein component c) is present in an amount sufficient to form a clear solution within 60 minutes of mixing components a), b) and c) at ambient temperature, provided that the amount of component c) is at least 5% by weight, based on the weight of components b) and c).

18. A coating composition which is free from polyols and comprises a) a polyisocyanate component, b) an aldimine corresponding to the formula:

$X_1\text{-}[N{=}CHCH(R_1)(R_2)]_n$ and c) a compound containing aspartate groups and corresponding to the formula

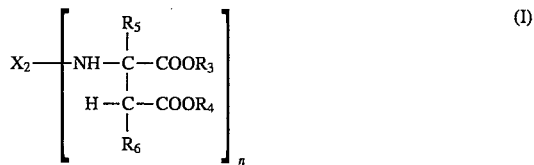

wherein $X_1$ and $X_2$ may be identical or different and represent an organic group which has a valency of n and is inert towards isocyanate groups at a temperature of 100° C. or less, $R_1$ and $R_2$ may be the same or different and represent hydrocarbon radicals containing 1 to 6 carbon atoms, $R_3$ and $R_4$ represent a methyl or ethyl group, $R_5$ and $R_6$ represent hydrogen and n is 2, wherein components a), b) and c) are present in an amount sufficient to provide an equivalent ratio of isocyanate groups to aldimine groups and aspartate groups of 0.5:1 to 20:1 and wherein component c) is present in an amount sufficient to form a clear solution within 60 minutes of mixing components a), b) and c), provided that the amount of component c) is at least 5% by weight, based on the weight of components b) and c).

19. The composition of claim 18 wherein $X_1$ corresponds to the radical obtained by removing the amino groups from bis-(4-aminocyclohexyl)methane and $R_1$ and $R_2$ are methyl.

20. The composition of claim 18 wherein said polyisocyanate is a polyisocyanate adduct which does not contain allophanate groups.

21. The composition of claim 17 wherein $X_1$ corresponds to the radical obtained by removing the amino groups from bis-(4-aminocyclohexyl)methane and $R_1$ and $R_2$ are methyl.

22. The composition of claim 18 wherein said polyisocyanate is a polyisocyanate adduct which contains allophanate groups.

23. The composition of claim 22 wherein $X_1$ corresponds to the radical obtained by removing the amino groups from bis-(4-aminocyclohexyl)methane and $R_1$ and $R_2$ are methyl.

24. The composition of claim 18 wherein said polyisocyanate is a polyisocyanate adduct containing monoisocyanurate and monoallophanate groups in a ratio of 10:1 to 1:10.

25. The composition of claim 24 wherein $X_1$ corresponds to the radical obtained by removing the amino groups from bis-(4-aminocyclohexyl)methane and $R_1$ and $R_2$ are methyl.

* * * * *